United States Patent [19]

Schucker

[11] 4,383,798
[45] May 17, 1983

[54] SINGULAR MOUNTED SERVOMOTOR SYSTEM FOR BULB TURBINES

[75] Inventor: Thomas R. Schucker, York, Pa.

[73] Assignee: Allis-Chalmers Corporation, Milwaukee, Wis.

[21] Appl. No.: 202,879

[22] Filed: Nov. 3, 1980

[51] Int. Cl.³ .................... F01D 17/10; F01D 17/12
[52] U.S. Cl. .................................... 415/150; 415/151
[58] Field of Search ............... 415/150, 160, 142, 159, 415/147

[56] References Cited

U.S. PATENT DOCUMENTS

| | | | |
|---|---|---|---|
| 143,984 | 10/1873 | Kirkhart et al. | 415/159 |
| 1,401,668 | 12/1921 | Brown et al. | 415/150 |
| 1,473,391 | 11/1923 | Taylor | 415/163 |
| 1,517,896 | 12/1924 | Enz | 415/150 X |
| 1,706,372 | 3/1929 | Anderson | 415/150 |
| 1,873,980 | 8/1932 | Ring | 415/163 |
| 2,109,239 | 2/1938 | Scholl | 415/159 |
| 2,109,240 | 2/1938 | Scholl | 415/13 |
| 2,163,706 | 6/1939 | Sayers | 415/159 |
| 2,273,458 | 2/1942 | Anderson | 415/159 |
| 2,603,411 | 7/1952 | Trumpa | 415/150 |
| 2,746,713 | 5/1956 | Peyrin et al. | 415/150 X |
| 3,841,790 | 10/1974 | Stein et al. | 415/147 X |

FOREIGN PATENT DOCUMENTS

| | | | |
|---|---|---|---|
| 1337456 | 9/1963 | France | 415/150 |
| 767373 | 10/1980 | U.S.S.R. | 415/160 |

Primary Examiner—Philip R. Coe
Assistant Examiner—Frankie L. Stinson
Attorney, Agent, or Firm—Timothy R. Conrad

[57] ABSTRACT

A common mounting base plate is secured to a turbine gallery floor and anchor a pair of servomotors which are connected to operate a wicket gate operator ring; the arrangement permits the servomotors to be angularly positioned to clear the gate ring counterweight and to allow the servomotors to operate in identical modes simultaneously—both push together or both pull together.

2 Claims, 1 Drawing Figure

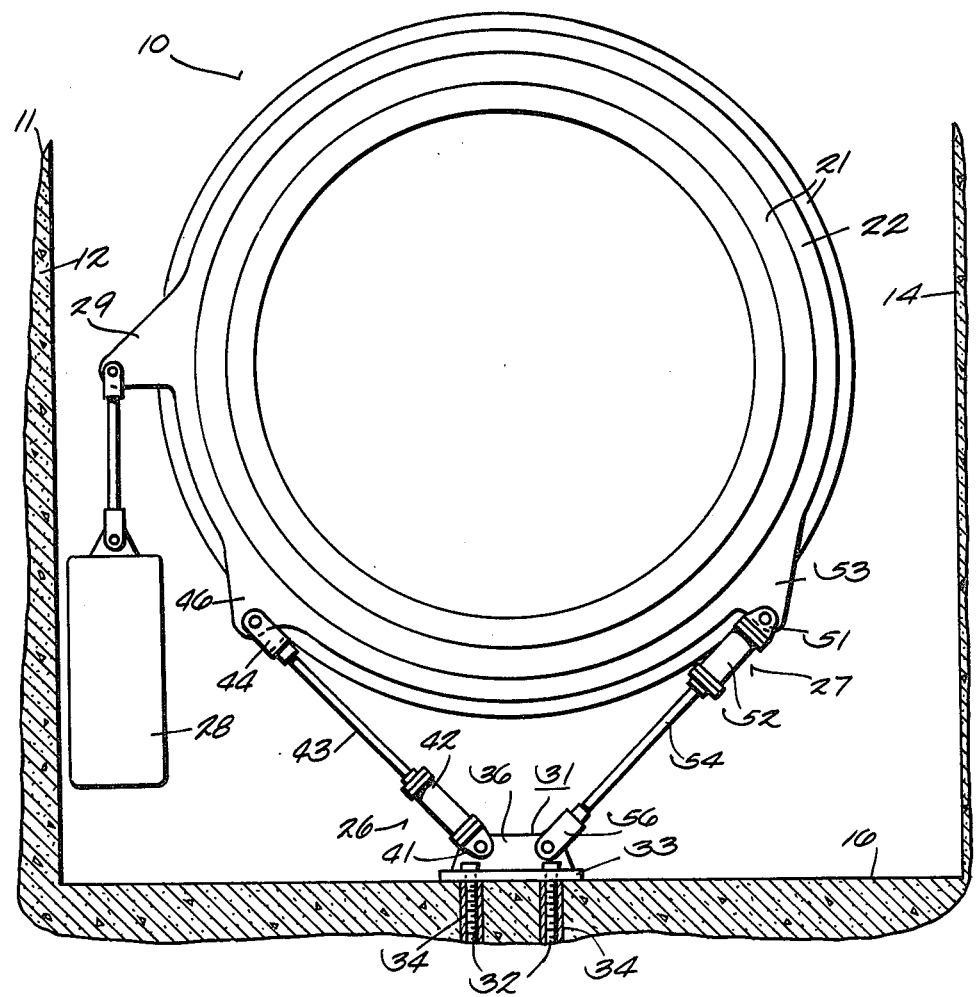

SINGULAR MOUNTED SERVOMOTOR SYSTEM FOR BULB TURBINES

BACKGROUND OF THE INVENTION

This invention relates in general to hydraulic machines such as bulb turbines which use adjustable wicket gates and, more particularly, to a means for mounting the wicket gate operating ring servomotors to optimize the use of a two servomotor and counterweight system for bulb turbines while making it easier to install the components and more accessible for maintenance and inspection.

Bulb turbines are a horizontal axis propeller type hydraulic turbine normally installed in a confined channel boxlike structure more commonly referred to as a turbine gallery. The large weight of the counterweight destroys the equal distribution of forces on the gate operating ring. With the increase in the size of the turbine the unequal distribution of force become larger requiring oversize servomotors to counteract the increase in the weight of the counterweight. Also, the increase in the size of the turbine, the counterweight and servomotor overcrowds the already limited space available in the turbine gallery. It is not economically feasible and generally not permissible to increase the gallery size because of physical limitations. Thus, servomotors have been located, as a matter of necessity, wherever space was to be found. The mounting brackets were generally located on the wall of the gallery, if possible, or on the gallery floor. In either case, it was required that two different mounting brackets had to be embedded and aligned off of the gallery wall. The brackets each had to be mounted in the vertical plane of the gate operating ring and at the correct angles.

It is the general object of this invention to provide for a single mounting arrangement for a plurality of gate servomotors.

Still another object of the present invention is to provide a single mounting arrangement which is very accessible to service personnel in the crowded turbine gallery.

Yet another object of the present invention is to provide a single mounting arrangement for a plurality of gate servomotors which is on the floor of the turbine gallery and which does not occasion interference between the counterweight and the servomotor.

SUMMARY OF THE INVENTION

The gate operating ring of a bulb turbine revolves around the axis of the turbine and is supported by the outer distributor cone. One purpose of the gate operating ring is to distribute the forces from the servomotor which operate the gate ring and the counterweight to the wicket gates. Normally, the servomotors are mounted to the concrete gallery wall by means of base plate and the counterweight hangs suspended fom the gate ring thus forcing an odd angular disposition of the adjacent servomotor mounting. The present invention utilizes a common mounting base plate which is easier to install accurately due to its centralized location on the gallery floor. The arrangement brings the servomotors close to the floor of the gallery facilitating access thereto for installation, inspection and maintenance. With the common mounting base plate, the servomotors are able to operate in the same mode at the same time, i.e., both push together or pull together. With the single floor base plate there is no interfering with the counterweight.

DESCRIPTION OF THE DRAWINGS

The single FIGURE herein is a view in vertical section through the bulb turbine distribution cone showing the wicket gate operating ring and the operating servomotor mounting arrangement of the present invention.

DESCRIPTION OF THE INVENTION

As shown in the drawing, the bulb turbine includes a circular outer distributor cone 21 around which a gate operating ring 22 revolves.

As shown in the drawing, the bulb turbine 10 is disposed within a concrete turbine gallery 11 having side walls 12 and 14 and a floor 16. The bulb turbine includes an outer distributor cone 21 around which a gate operating ring 22 revolves. As is well known, the gate operating ring has a plurality of wicket gate operating links (not shown) attached to it for effecting the opening and closing of associated wicket gates (not shown) which control the flow water to the runner blades depending upon the direction of rotation of the gate ring 22. The gate operating ring 22 distributes the forces from a pair of servomotors 26 and 27 and the counterweight 28 to the wicket gates (not shown). As shown, the counterweight 28 is pivotally suspended from a lug 29 which is integrally formed with the gate operating ring and extends radially outwardly therefrom.

The mounting arrangement for the servomotors 26 and 27 of the present invention utilizes a common mounting base plate 31 which facilitates installation. A plurality of bolts 32 (two of which are shown) extend through side flanges 33 (one of which is shown). The bolts 32 are securely engaged in anchors 34 casted into the gallery floor 16. A central vertical rib 36 extends upwardly from the base plate and serves to pivotally receive a clevis 41 which is screw-fastened to the end of the servomotor cylinder 42. Within the cylinder 42 there is the usual reciprocal piston (not shown) to which a piston rod 43 is secured. The rod 43 extends outwardly of the cylinder and carries, on its free end, a clevis 44 which is pivotally secured to a radially extending lug 46 of the gate ring 22.

The servomotor 27 is likewise connected to the rib 36 but in the opposite manner. That is, a clevis 51 which is secured to the end of a cylinder 52 is pivotally secured to a radially extending lug 53 that is integrally formed with the gate ring 22. A piston rod 54 having one end connected to a piston (not shown) reciprocal within the cylinder 52, is provided on its free end with a clevis 56. The clevis 56 is pivotally secured to the vertical rib 36, as shown. With the mounting arrangement disclosed, the servomotors 26 and 27 are now close to the gallery floor 16 for easy access during assembly, inspection and/or maintenance.

The mounting arrangement disclosed also makes it possible to operate the servomotors 26 and 27 in the same mode, i.e., both push together and both will pull together. To open the wicket gates to start the turbine, the servomotors 26 and 27 are pressurized on the head side of their respective pistons (not shown). This causes the gate operating ring to rotate in a clockwise direction about the outer distributor cone 21. To close the wicket gates to stop the turbine, the head side of the servomotor pistons are vented at the same time the rod side of the pistons are pressurized. This effects rotation of the gate ring 22 in a counterclockwise direction. Should pressure to the servomotors be interrupted, the counterweight 28 provides the closing force on the gate ring 22 in an emergency.

As can be seen, the present mounting of the servomotors 26 and 27 maintains the servomotor 26 free and clear of the counterweight 28. Thus, during assembly of the turbine the danger of damaging the servomotor when connecting the counterweight 28 to the gate ring 22 is minimized. Also the pendulum effect imparted to the counterweight upon the sudden loss of pressure to the servomotors 26 and 27 will not cause the mass of the counterweight 28 to swing into engagement with the adjacent servomotor 26.

The embodiments of the invention in which an exclusive property or privilege is claimed are defined as follows:

1. In a bulb turbine machine having a gate operating ring with a generally horizontal axis and rotatable about said axis; said ring disposed within a turbine gallery having a floor beneath said ring; a counterweight mass connected to a first side of said ring and suspended downwardly therefrom; said counterweight operable to urge said ring to rotate about said axis from a gate open position to a gate closed position;

a single stationary mounting bracket secured to said floor directly beneath said ring and said axis;

a first servomotor comprising a fluid pressure cylinder having a head end and a reciprocal piston rod extending from said cylinder opposite said head end to a free end with said head end of said first servomotor pivotally secured to said ring on a second side of said ring opposite said first side and said free end of said first servomotor pivotally secured to said bracket;

a second servomotor comprising a fluid pressure cylinder having a head end and a reciprocal piston rod extending from said cylinder opposite said head end to a free end with said head end of said second servomotor pivotally secured to said bracket and said free end of said second servomotor pivotally secured to said ring on said first side;

said first and second servomotors operable to cooperate to rotate said ring about said axis between said gate open and closed positions with said counterweight depending from said first side of said ring with said servomotors operable to rotate said ring to said gate open position by pressurization of said head ends of both of said servomotors.

2. In a bulb turbine machine according to claim 1, with said bracket having an upwardly projecting rib member with said free end of said first servomotor and said head end of said second servomotor pivotally secured to said rib member.

* * * * *